United States Patent [19]
Takeyama et al.

[11] Patent Number: 5,937,917
[45] Date of Patent: Aug. 17, 1999

[54] CHARGING METHOD AND CHARGING STRUCTURE OF COMBUSTIBLE GAS AND OXIDIZER GAS, AND MATERIAL TO BE CHARGED BY USING THE CHARGING METHOD AND THE CHARGING STRUCTURE

[75] Inventors: Shigeru Takeyama, Kawasaki; Takuhiro Ono, Zama; Yoshikazu Kawauchi, Kawasaki; Kiyoshi Yamamori, Yokohama; Hiroyuki Takahashi, Odawara; Takuro Koyama, Chigasaki; Mitsugu Tsuyuki, Odawara; Yasushi Usui, Kawasaki, all of Japan

[73] Assignees: Matsushita Electric Industrial Co., Ltd., Osaka, Japan; Miyata Industry Co., Ltd., Kanagawa, Japan

[21] Appl. No.: 08/873,020

[22] Filed: Jun. 11, 1997

[30] Foreign Application Priority Data

Jun. 12, 1996 [JP] Japan .................................... 8-151391

[51] Int. Cl.[6] ....................................................... B65B 1/04
[52] U.S. Cl. .............................. 141/18; 141/39; 141/100; 141/286
[58] Field of Search .................................. 141/3, 4, 9, 18, 141/39, 47–49, 54, 63, 64, 100, 104, 286

[56] References Cited

U.S. PATENT DOCUMENTS

| | | |
|---|---|---|
| 3,304,963 | 2/1967 | Greenlee ........................................ 141/9 |
| 3,687,176 | 8/1972 | Fernandes et al. ...................... 141/286 |
| 4,262,713 | 4/1981 | Egami . |
| 4,611,641 | 9/1986 | Carter, Sr. . |
| 4,977,747 | 12/1990 | Frejaville et al. ............................ 141/4 |
| 5,348,344 | 9/1994 | Blumenthal et al. . |
| 5,427,160 | 6/1995 | Carson et al. . |

FOREIGN PATENT DOCUMENTS

| | | |
|---|---|---|
| 0 487 183 A1 | 5/1992 | European Pat. Off. . |
| 0 556 753 A1 | 8/1993 | European Pat. Off. . |
| 44 36 493 A1 | 4/1995 | Germany . |
| 5-278554 | 10/1993 | Japan . |

*Primary Examiner*—Steven O. Douglas
*Attorney, Agent, or Firm*—Armstrong, Westerman, Hattori, McLeland & Naughton

[57] ABSTRACT

A charging structure of a combustible gas and an oxidizer gas includes a container for containing the combustible and oxidizer gases therein. The container has a charging port for charging the combustible and oxidizer gases. The charging structure also includes a sealing member for sealing the charging port and a separating member for substantially separating the combustible gas and the oxidizer gas at least in the vicinity of the charging port during a predetermined time period beginning, from a time point after charging of the combustible and oxidizer gases into the container through the charging port to a time point when the charging port is sealed by the sealing member. The separating member defines a flow path such that the combustible gas and the oxidizer gas are not substantially mixed therein during the predetermined time period in such a case where one of the combustible and oxidizer gases is first charged and thereafter the other of the combustible and oxidizer gases is charged.

13 Claims, 6 Drawing Sheets

CHARGING METHOD AND CHARGING STRUCTURE OF COMBUSTIBLE GAS AND OXIDIZER GAS, AND MATERIAL TO BE CHARGED BY USING THE CHARGING METHOD AND THE CHARGING STRUCTURE

BACKGROUND OF THE INVENTION

1. Field of the Invention

The present invention relates to a charging method and a charging structure of a combustible gas and an oxdizer gas, as well as a material to be charged by using the charging method and the charging structure.

2. Description of the Related Art

As is disclosed in Japanese Patent Application Laid-open No. 5-278554, a gas generating apparatus for an air bag apparatus contains in its high-pressure container a combustible gas mixture for inflating the air bag. The high-pressure container is formed at its one end wall surface with an opening to which a cap is mounted. The cap is provided with a passage through which various gases are charged into the high-pressure container under a predetermined pressure. After the various gases are charged into the high-pressure container, the passage of the cap is sealed.

Such a combustible gas mixture is prepared by mixing the combustible gas and the oxdizer gas at certain composition for burning. A lower limit and an upper limit of the composition of the combustible gas which is required for burning are called a flammable lower limit and a flammable upper limit, respectively. And a range between these flammable lower and upper limits is called a flammable range or a combustion range. Further, a minimum igniting energy of each of the combustible and oxdizer gases with the flammable range is 0.02 mj (milli joule) if a hydrogen is used as the combustible gas and an oxygen is used as the oxdizer gas.

When a gas is charged into the high-pressure container under pressure, the gas temperature is increased by heat generated due to compression of the gas. When the combustible and oxdizer gases are charged, if the gas temperature reaches a temperature of a spontaneous combustion (400° C. or higher in the case of hydrogen), the gas unintentionally starts burning even if there is no igniting source.

That is, in a gas generating apparatus for an air bag apparatus, when the combustible and oxdizer gases are charged into the high-pressure container and the charging port is sealed, it is desired to take such characteristics of the gases into consideration, and to establish a sufficiently practical charging technique.

SUMMARY OF THE INVENTION

Accordingly, it is an object of the present invention to overcome the above described problems of the prior art, and to provide a practical method for charging the combustible and oxdizer gases into the high-pressure container.

According to the present invention, in a step for charging a combustible gas and an oxdizer gas into a high-pressure container through a charging port, the composition of a mixed gas is set out of a flammable range in the vicinity of the charging port. Therefore, it is possible to reliably charge the combustible gas and the oxdizer gas into the container.

To achieve the above object, according to a first aspect and feature of the present invention, there is provided a charging method of a combustible gas and an oxdizer gas, comprising a combustible gas charging step for charging the combustible gas and an oxdizer gas charging step for charging the oxdizer gas, both into a container through a charging port provided to the container, wherein during at least one of the two charging steps, a composition of a combustible mixed gas created in the vicinity of the charging port is controlled in a range except a flammable range. Therefore, even if a spark or a heat is generated at the time of sealing of the charging port, no influence is inflicted on the mixture gas.

According to a second aspect and feature of the invention, in addition to the first aspect, in at least one of the two charging steps, an inert gas is mixed and charged.

According to a third aspect and feature of the invention, in addition to the first aspect, the method further includes an inert gas charging step for charging an inert gas, and wherein during at least one of the three charging steps, a composition of a combustible mixed gas created in the vicinity of the charging port is controlled in a range except a flammable range.

According to a fourth aspect and feature of the invention, in addition to the first, second or third aspect, the method further includes a step for discharging a gas in a charging path and/or for drawing to a vacuum, which step being conducted at least between the combustible gas charging step and the oxdizer gas charging step.

According to a fifth aspect and feature of the invention, in addition to the first, second, third or fourth aspect, the combustible gas charging step and the oxdizer gas charging step are conducted in reverse order.

According to a sixth aspect and feature of the invention, in addition to the first, second, third, fourth or fifth aspect, the inert gas charging step is conducted after the combustible gas charging step and/or the oxdizer gas charging step.

According to a seventh aspect and feature of the invention, in addition to the first aspect, the method further includes a cooling step for cooling the container.

According to an eighth aspect and feature of the invention, the method further includes a grounding step for grounding the container.

According to a ninth aspect and feature of the invention, there is provided a charging structure of a combustible gas and an oxdizer gas, comprising separating means for substantially separating the combustible gas and the oxdizer gas at least in the vicinity of the charging port during a predetermined time period beginning, from a time point after charging of the combustible and oxdizer gases into the container through a charging port provided in the container, to a time point when the charging port is sealed by a sealing member. Therefore, even if a spark or a heat is generated at the time of sealing of the charging port, no influence is inflicted on the mixture gas.

According to a tenth aspect and feature of the invention, in addition to the ninth aspect, the separating means comprises a partitioning member which partitions the container into a smaller chamber surrounding the charging port and a larger chamber surrounding the smaller chamber, and which includes a fine hole for bringing the smaller and larger chambers into communication with each other.

According to an eleventh aspect and feature of the invention, in addition to the ninth aspect, the separating means comprises a spiral tube-like member for defining a space which is spirally continuous with the charging port in the container.

According to a twelfth aspect and feature of the invention, in addition to the ninth aspect, the separating means comprises a cylindrical member for defining a space which is spirally continuous with the charging port in the container.

According to a thirteenth aspect and feature of the invention, in addition to the ninth aspect, the separating means comprises a deflection plate disposed such as to oppose to the charging port in the container for deflecting a gas flow path.

According to a fourteenth aspect and feature of the invention, in addition to the thirteenth aspect, the deflection plate is provided with a partitioning plate for rotating and flowing out the gas.

According to a fifteenth aspect and feature of the invention, in addition to the ninth, tenth, eleventh, twelfth, thirteenth or fourteenth aspect, at least a portion of the separating means is provided with throttling means for throttling a flow of the gas.

According to a sixteenth aspect and feature of the invention, in addition to the ninth, tenth, eleventh, twelfth, thirteenth, fourteenth or fifteenth aspect, at least a portion of the separating means is provided with a check valve for preventing a back-flow of the gas.

According to a seventeenth aspect and feature of the invention, in addition to the ninth, tenth, eleventh, twelfth, thirteenth, fourteenth, fifteenth or sixteenth aspect, the sealing member for the charging port is any one of a pin, a cap or a plate.

According to an eighteenth aspect and feature of the invention, in addition to the seventeenth, the sealing member includes a portion which is softer than the container.

According to a nineteenth aspect and feature of the invention, in addition to the ninth, tenth, eleventh, twelfth, thirteenth, fourteenth, fifteenth, sixteenth aspect, the separating means includes an ejection port provided with dispersing means for dispersing the gas flow.

According to a twentieth aspect and feature of the invention, in addition to the nineteenth aspect, the separating means includes an ejection port provided with dispersing means for dispersing the gas flow.

According to a twenty-first aspect and feature of the invention, there is provided a material comprising a combustible gas and an oxdizer gas charged into a container by using the charging method according to any one of the first to eighth aspect.

According to a twenty-second aspect and feature of the invention, there is provided a material comprising a combustible gas and an oxdizer gas charged by means of the charging structure according to any one of the ninth to eighteenth aspect.

According to a twenty-third aspect and feature of the invention, the material comprising a combustible gas and an oxdizer gas according to any one of the nineteenth or twentieth aspect is used for a gas generating apparatus for an air bag apparatus The above and further objects, features and advantages of the present invention will become more apparent from the following detailed description taken in conjunction with the accompanying drawings.

DETAILED DESCRIPTION OF THE PREFERRED EMBODIMENTS

Figure 1:
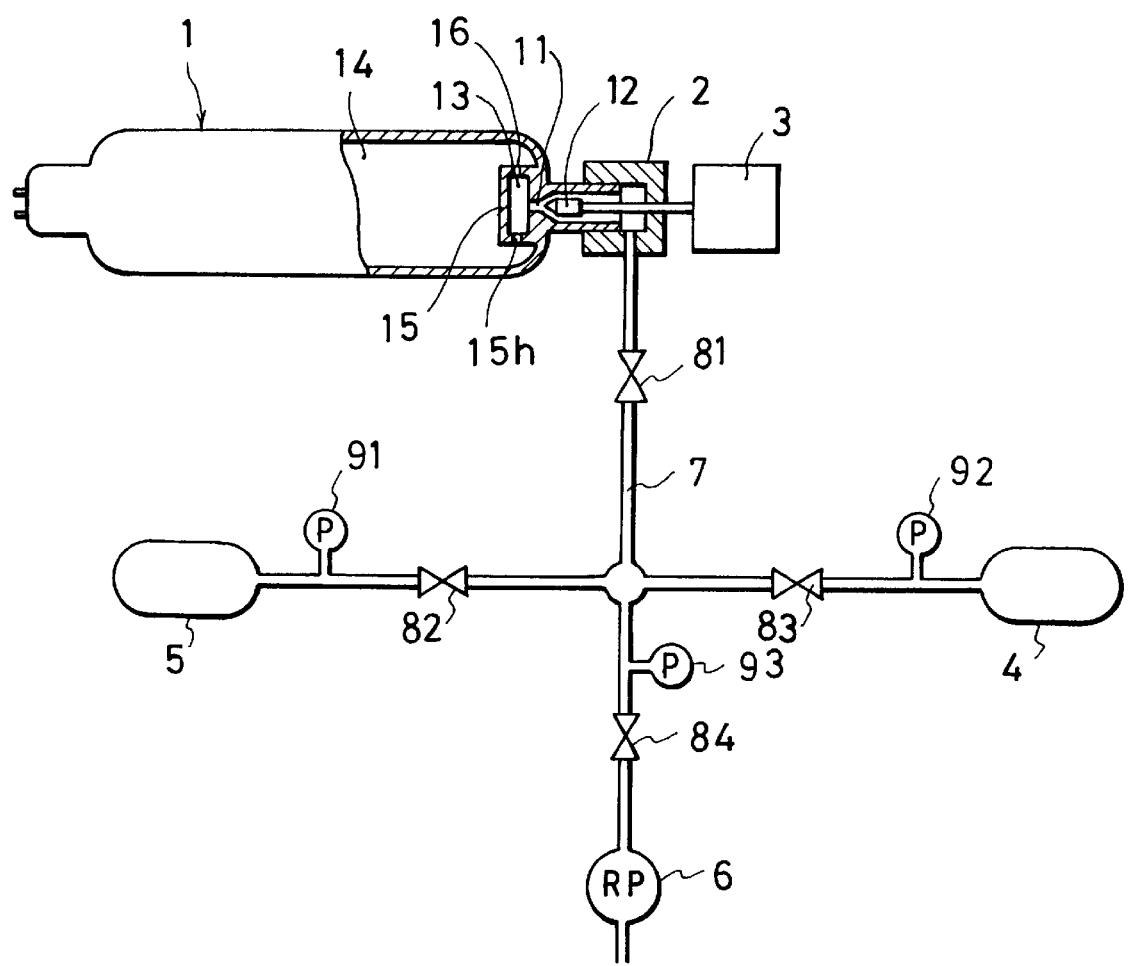
FIG. 1 shows a system used for a charging method of a combustible gas and an oxdizer gas, and a high-pressure container provided with a charging structure of the combustible gas and the oxdizer gas according to the present invention.

FIG. 1 shows the entire system used for a charging method of a combustible gas and an oxdizer gas according to an embodiment of the present invention. In FIG. 1, a reference numeral 1 denotes a high-pressure container, a reference numeral 11 denotes a charging port of the high-pressure container 1, a reference numeral 12 denotes a sealing member for sealing the charging port 11, and a reference numeral 2 denotes a charging jig to be mounted to the high-pressure container 1 by screw means or pressing means. A reference numeral 3 denotes a sealing member operating mechanism for screwing the sealing member 12 into the charging port 11 by a piston mechanism or a screw mechanism. A reference numeral 4 denotes a combustible gas source or a mixture gas source of the combustible gas and an inert gas, a reference numeral 5 denotes an oxdizer gas source or a mixture gas source of an oxdizer gas and an inert gas, a reference numeral 6 denotes a vacuum pump. And a reference numeral 7 denotes a charging path for connecting each of the gas sources 4 and 5, the vacuum pump 6 and the high-pressure container 1 through the charging jig 23. By providing the charging path 7 with on-off valves 81, 82, 83 and 84, as well as pressure gauges 91, 92 and 93, the charging speed is controlled when a gas is charged into the high-pressure container 1.

As the combustible gas, at least one of a hydrogen, a hydrocarbon group and an alcohol group is used. As the oxdizer gas, at least one of an oxygen and a halogen is used. As the inert gas, at least one of a helium, a nitrogen and an argon is used. An air can be used as the mixture gas of the oxdizer gas and the inert gas.

In FIG. 1, the high-pressure container is provided with a charging structure of the combustible gas and the oxdizer gas according to the embodiment of the present invention. A reference numeral 15 denotes a bottomed cylindrical partitioning member for partitioning the charging port 11 the high-pressure container 1 into a smaller chamber 13 surrounding the charging port 11 and a larger chamber 14 surrounding the smaller chamber 13. The partitioning member 15 is formed at a portion thereof with an ejection port 16 comprising at least one fine hole 15h for bringing the smaller and larger chambers 13 and 14 into communication with each other.

Next, a method for charging the combustible gas and the oxdizer gas into the high-pressure container 1 using the above described system will be described with reference to FIG. 1. Here, it is supposed that a hydrogen is used as the combustible gas, and an oxygen is used as the oxdizer gas. In FIG. 1, the charging jig 2 is mounted to the high-pressure container 1 by a known method such as screw means or pressure means. In a state where the high-pressure container 1 and the charging jig 2 are in communication with each other, the on-off valves 82 and 83 are closed. Next, the on-off valves 81 and 84 are opened. The vacuum pump 6 is operated to draw a vacuum in each of the charging path 7, the charging jig 2 and the high-pressure container 1. After drawing the vacuum, the on-off valve 84 is closed and the on-off valve 83 is opened to charge the hydrogen from the combustible gas source 4 into the high-pressure container 1 through the charging port 11. Here, the hydrogen is passed from the charging port 11 into the smaller chamber 13, and is charged into the larger chamber 14 of the high-pressure container 1 from the ejection port 16. If the pressure gauge 93 monitors that a pressure within the larger chamber 14 reaches a predetermined pressure, both the on-off valves 81 and 83 are closed. In this manner, the hydrogen is first charged into the high-pressure container 1 in a range except a flammable range. At that time, the sealing member operating mechanism 3 has not yet been operated, the charging port 11 has not yet been sealed by the sealing member 12.

Next, the on-off valve 84 is opened to draw a vacuum, by the vacuum pump 6, in only a region defined by the valves 81, 82 and 83 among the entire region of the charging path 7.

After drawing the vacuum, the on-off valve 84 is closed, and the on-off valves 81 and 82 are opened to charge the oxygen from the oxdizer gas source 5 into the high-pressure container 1. The oxygen is passed into the smaller chamber 13 from the charging port 11, and is charged into the larger chamber 14 of the high-pressure container 1 while extruding the hydrogen within the small chamber 13. At that time, the fine hole 15$h$ is sufficiently small, a back-flow of the hydrogen is hardly occurred. In the smaller chamber 13, the hydrogen has been replaced by the oxygen, which means that the oxygen has been charged in a range except the flammable range. When the pressure within the high-pressure container 1 reaches a predetermined pressure, the sealing member operating mechanism 3 is operated to allow the sealing member 12 to seal the charging port 11 of the high-pressure container 1. After that, the oxygen within each of the charging jig 2 and the charging path 7 is discharged from an atmosphere discharging valve which is not shown, and the charging jig 2 is detached.

In order to make sure that the charging method of the combustible gas and the oxdizer gas as well as the structure of the high-pressure container 1 are in safe conditions, an experiment for charging the gas was done by the same charging method using a helium instead of the hydrogen, and the composition of the gas in the vicinity of the charging port 11 of the high-pressure container 1 was measured. Just after the charging, the gas within the smaller chamber 13 of the high-pressure container 1 was sampled, and the composition of the helium was checked by using a quarter pole mass spectrometer, and it was found that the density was 1% or less. That is, if the above result is considered by replacing the helium by the hydrogen, it can be determined that the density of the gas in the vicinity of the charging port 11 is lower than the flammable range of the hydrogen.

Therefore, by the described charging method of the combustible gas and the oxdizer gas, the density of the mixture gas in the vicinity of the charging port 11 is in a range except the flammable range in the charging step for charging the combustible gas and the oxdizer gas. Therefore, even if a spark or a heat is generated at the time of sealing of the charging port 11, no influence is inflicted on the mixture gas, and a utility can be secured.

According to the charging structure for charging the combustible gas and the oxdizer gas designed within the high-pressure container, in the vicinity of the charging port 11, both the gases are separated from each other by means of the smaller chamber in the vicinity of the charging port 11, and the composition of the gases are controlled in a range except the flammable range. Therefore, even if a spark or a heat is generated at the time of sealing of the charging port 11, no influence is inflicted on the mixture gas, and a utility can be secured.

It should be noted that in the above described embodiment, although the various gases are charged under the pressure control, the pressure control can be replaced by weight control or flow rate control.

In the above embodiment, the combustible gas is first charged, and the oxdizer gas is charged thereafter, but there is no particular order. Further, the inert gas source may be added to the embodiment. In such a case also, there is no particular order as to which gas should be charged first. However, if the combustible gas is charged lastly, it is preferable to draw a vacuum after charging the combustible gas.

Further, in each of the charging steps, it is possible to conduct the charging while cooling the high-pressure container 1 and/or the charging jig 2. Because this method is effective for controlling a heat generated during each of the charging steps by compression, it is possible to control the temperature of the mixture gas under the temperature of spontaneous combustion.

Also, in the described embodiment, although the charging port 11 is lastly sealed by the sealing member 12, such sealing may be conducted every time when the gas-charging step is conducted. In such a case, by closing the charging port 11 using the sealing member 12, it is possible to draw a vacuum not only in the charging path 7, but also in the charging jig 2. It should be noted that it is preferable to draw a vacuum after the inert gas is charged for enhancing the charging accuracy of the gas, rather for a security.

A method for sealing the charging port 11 differs depending on what element is used as the sealing member 12. More specifically, 1) if a sealing pin is used as the sealing member 12, the sealing is conducted by fitting the sealing pin into the charging port 11; 2) if a screw is used, the sealing is conducted by screwing the screw into the charging port 11; 3) if a cap is used, the sealing is conducted by caulking the cap into the charging port 11; and 4) if a plate is used, the sealing is conducted by welding the plate onto the charging member 12. It should be noted that the pin, the screw or the cap is used as the sealing member 12, it is preferable that such element includes a portion which is soft against the high-pressure container 1.

When the charging port 11 is sealed by the sealing member 12, if the high-pressure container 1 and/or the sealing member operating mechanism 3 is grounded (not shown), a higher security can be secured.

In the above described embodiment, the partitioning member 15 is used as means for substantially separating various gases in the vicinity of the charging port 11 during each of the charging steps of the combustible gas and the oxdizer gas. The partitioning member 15 may assume any arbitrary shape. A shape of the smaller chamber 13 may be formed into cubic, quadratic prism or spherical shape. But a preferable shape is one having no angle. This is because if the shape of the smaller chamber 13 has an angle, a gas may be collected at the angled portion. The number of the ejection port 16 and an axial thereof may arbitrarily be selected. Further, as the separating means, the following various separating means can be used.

Figure 2A:
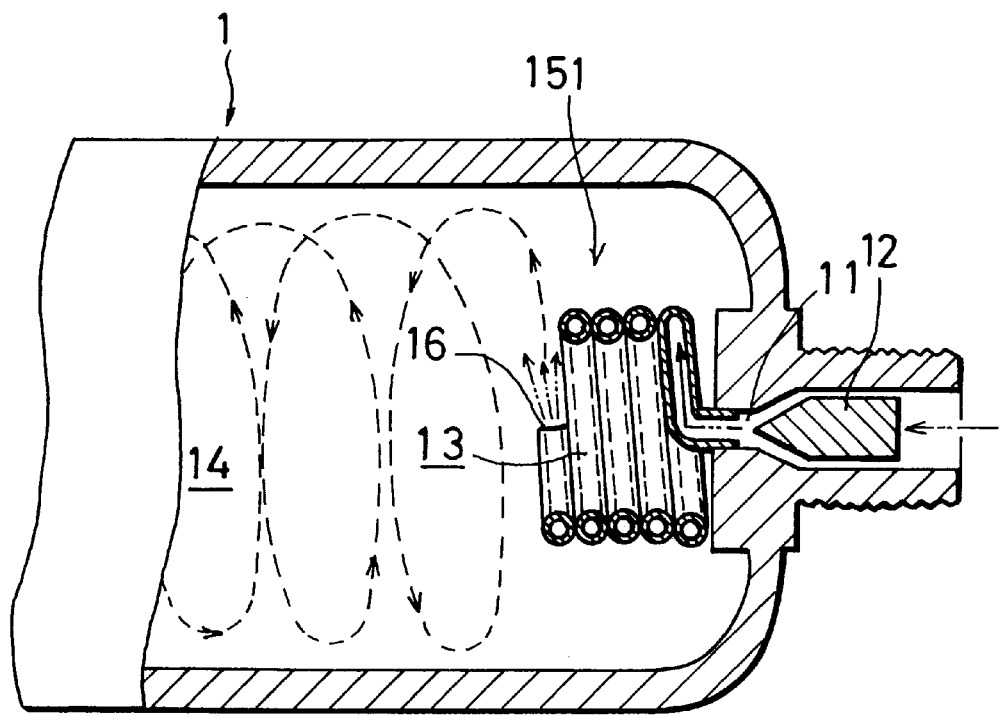
FIG. 2A is a sectional side view of an essential portion of separating means mounted to the high-pressure container according to a first modification.
Figure 2B:
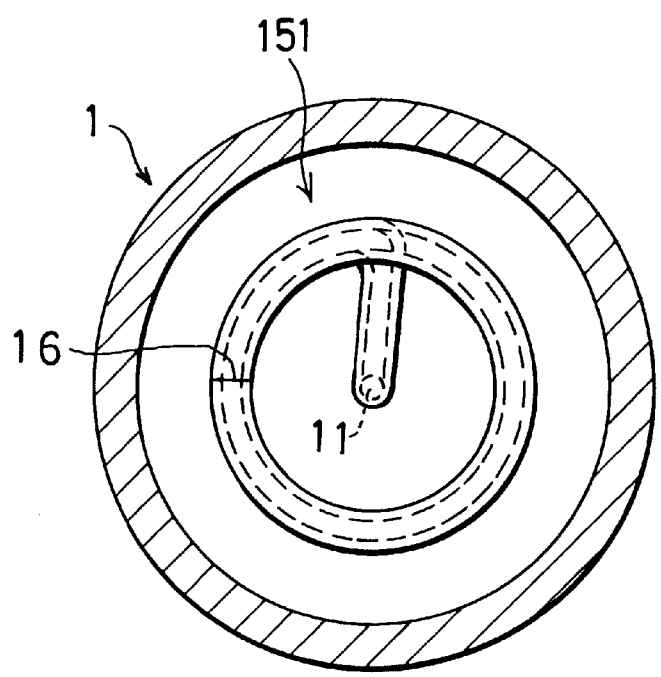
FIG. 2B is a sectional front view of the separating means.

FIGS. 2A and 2B shows a first modification of the separating means. This separating means comprises a spiral tube 151 having one end mounted to the charging port 11 within the high-pressure container 1. The spiral tube 151 forms a flow path which has a sufficiently long length and a sufficiently small diameter for preventing a back-flow of the gas. A gas charged later extrudes a gas charged first out of the tube 151 into the larger chamber 14, thereby controlling the composition of the gas in the vicinity of the charging port 11 in a range except the flammable range by means of the spiral tube 151.

Figure 3:
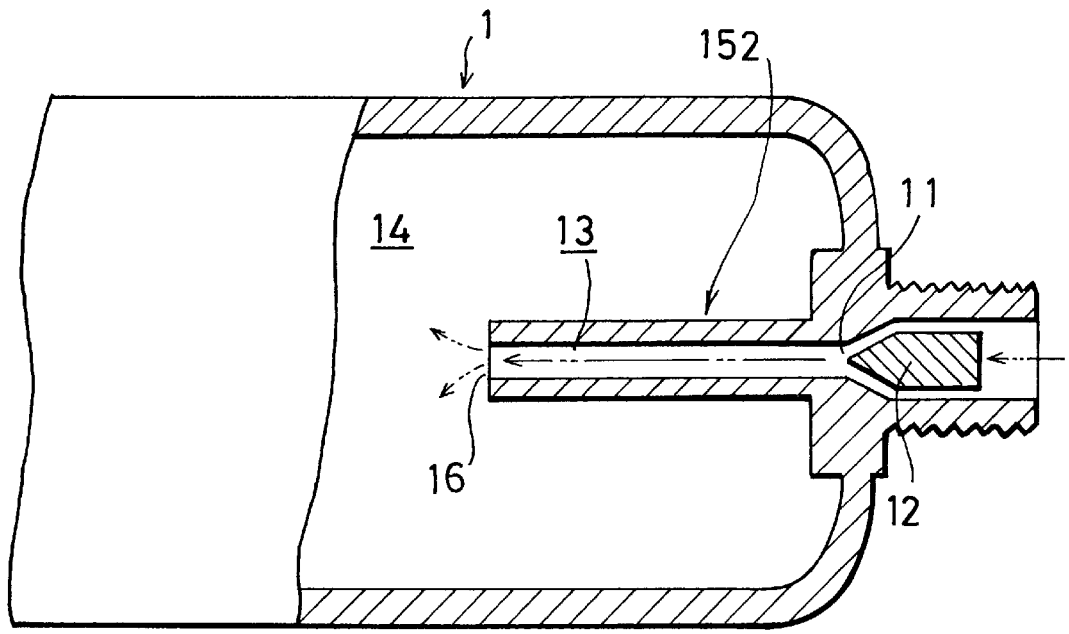
FIG. 3 is a sectional side view of an essential portion of separating means mounted to the high-pressure container according to a second modification.

FIG. 3 shows a second modification of the separating means. This separating means is a cylindrical tube 152 having one end mounted to the charging port 11 within the high-pressure container 1. A gas charged later extrudes a gas charged first out of the tube 152 into the larger chamber 14, thereby controlling the composition of the gas in the vicinity of the charging port 11 in a range except the flammable range. In this modification, the tube 152 is straight, but the tube 152 is formed with at least one bent portion.

Figure 4:
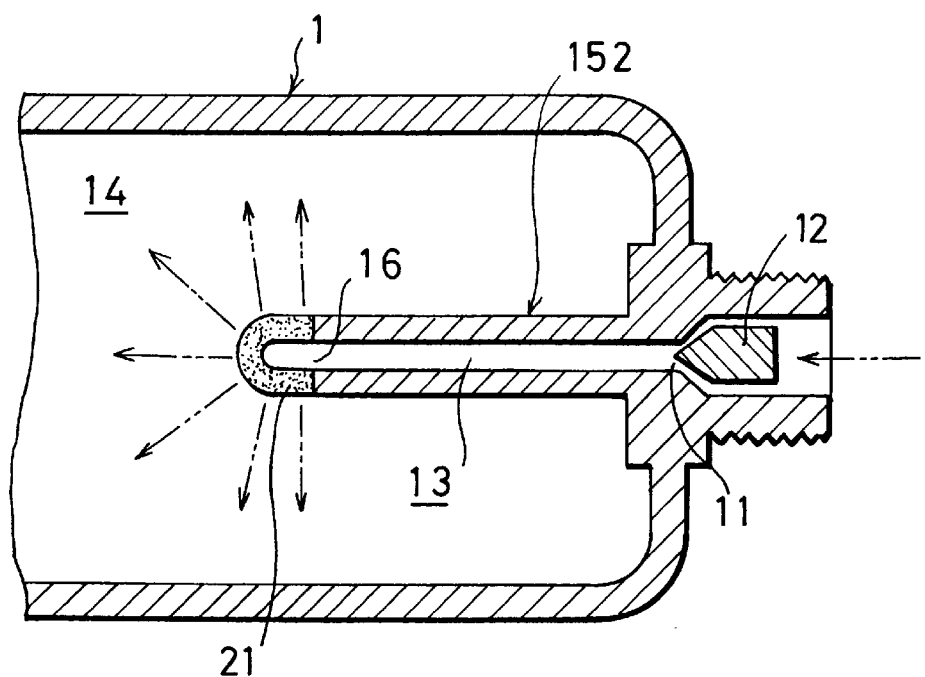
FIG. 4 is a sectional side view of an essential portion of separating means mounted to the high-pressure container according to a third modification.

FIG. 4 shows a third modification of the separating means. This separating means comprises the cylindrical tube 152 of the second modification but is provided at its tip end with dispersing means 21. This dispersing means 21 is made of a material having an air permeability such as a mat-like metal formed by laminating sintered metals or fine metal fibers.

A gas charged later extrudes a gas charged first out of the tube 152 into the larger chamber 14. At that time, the gas charged first is extruded into the larger chamber 14 while being dispersed. This arrangement makes it possible to control the composition of the gas in the vicinity of the charging port 11 in a range except the flammable range. In this modification also, the tube 152 may be formed with a bent portion.

Figure 5A:
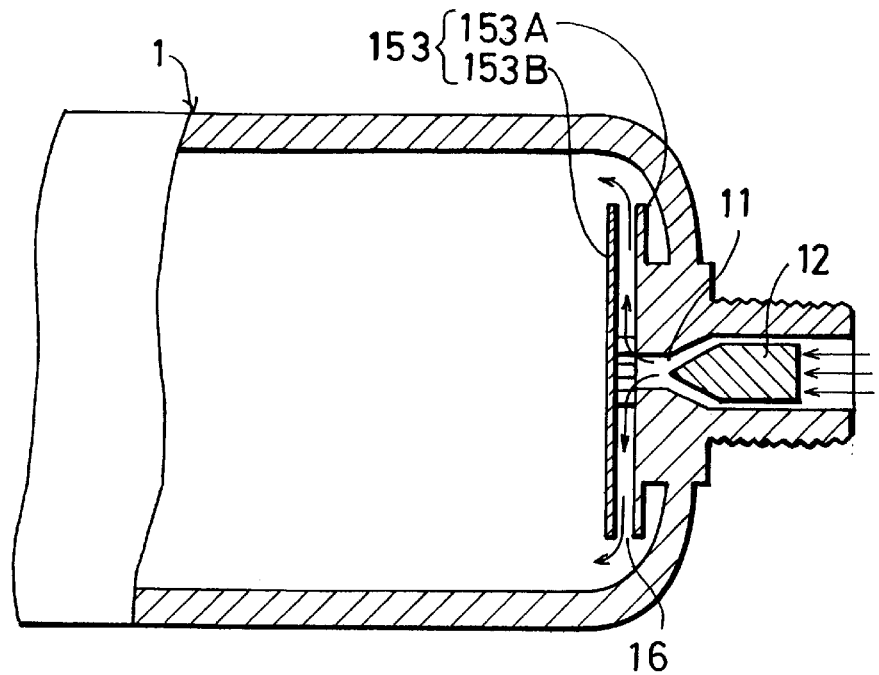
FIG. 5A is a sectional side view of an essential portion of separating means mounted to the high-pressure container according to a fourth modification.
Figure 5B:
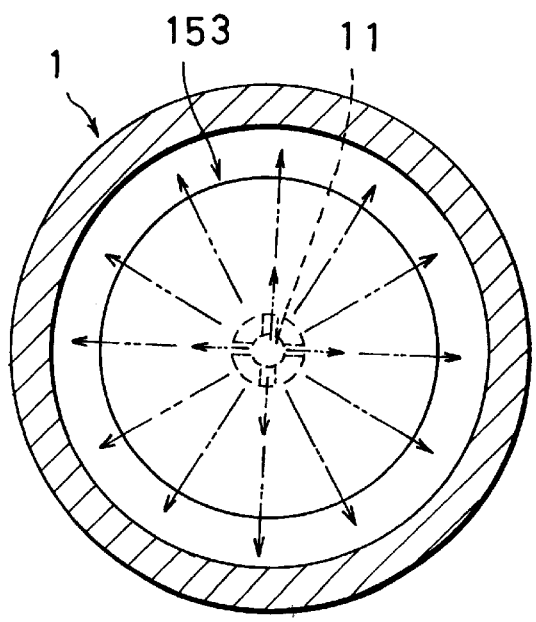
FIG. 5B is a sectional front view of the separating means.

FIGS. 5A and 5B show a fourth modification of the separating means. This separating means comprises a deflection 153 plate having: a first circular plate 153A continuously formed at a periphery of the charging port 11 of the high-pressure container 1 and extending toward an outer periphery of the charging port 11; and a second circular plate 153B disposed such as to leave a fine clearance from the first circular plate 153A. The deflection plate 153 forms a flow path for deflecting, in the high-pressure container 1, a gas flowing from the charging port 11 toward the outer periphery (in the direction of the arrow in FIGS. 15A and 15B). The second circular plate 153B may have a curved surface. Even with such a second circular plate 153B, a gas charged later extrudes out a gas charged first in the vicinity of the charging port 11 of the high-pressure container 1 through a gas flow path of the deflection plate 153 and as a result, both the gases are substantially separated from each other. Therefore, it is possible to control the composition of the gas in the vicinity of the charging port 11 in a range except the flammable range.

Figure 5C:
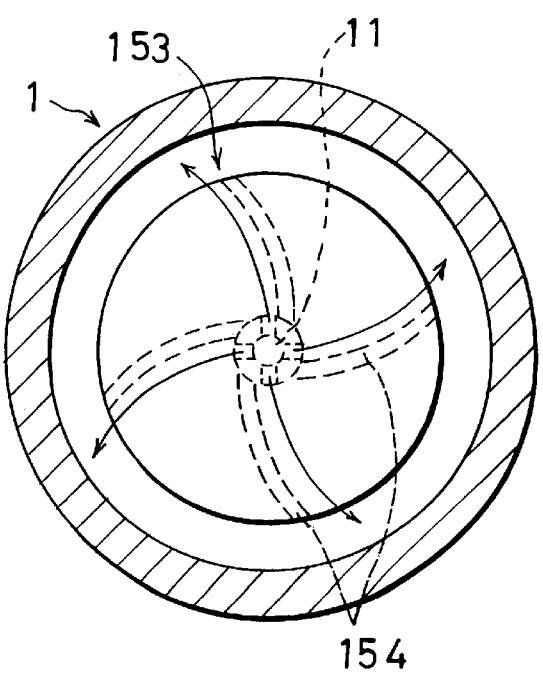
FIG. 5C is a sectional front view of the separating means provided with a partitioning plate.

Here, as is shown in FIG. 5C, a curved partitioning plate 154 may be provided between both the circular plates 154A and 153B. With this arrangement, it is possible to flow the gas while rotating the gas around an axis perpendicular to the plane of FIG. 5C, thereby allowing the gas to be dispersed in the high-pressure container 1 swiftly.

In each of the separating means of the high-pressure container 1, each of the flow paths through which the gas passes may be provided with means for narrowing the flow path or a check valve for preventing the back-flow of the gas. With such an arrangement, the back-flow of the gas can be prevented more reliably and the gases can be separated more reliably also. Further, the ejection port 16 except that of the third modification can be provided with the dispersing means 21 shown in FIG. 4.

Figure 6:
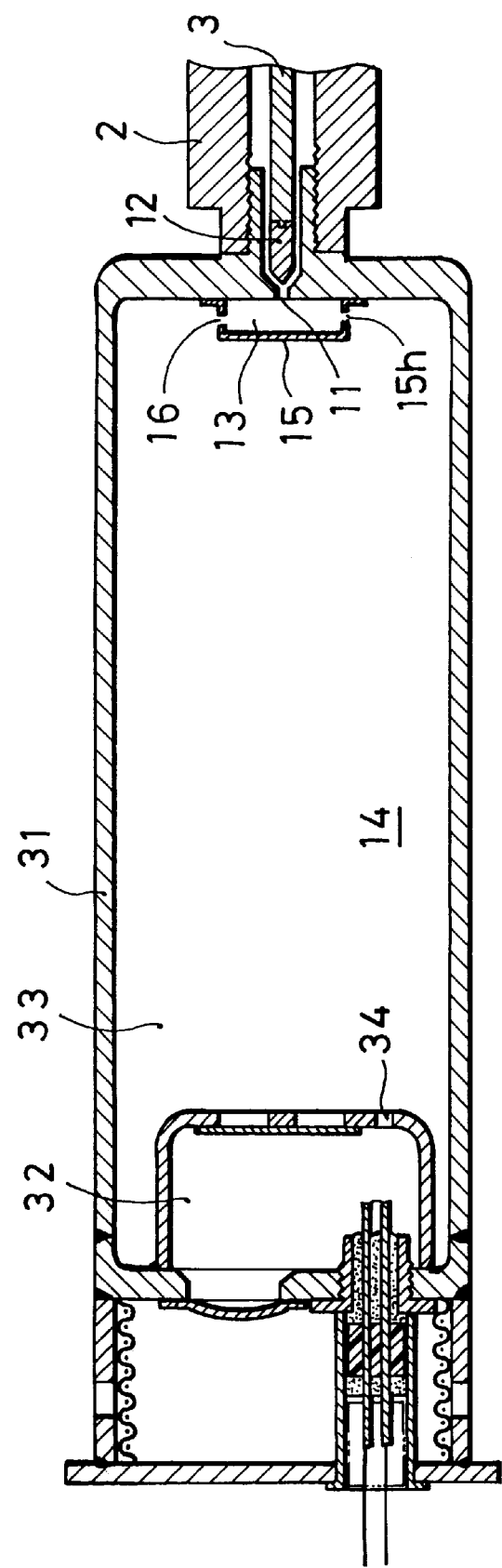
FIG. 6 is a sectional side view of a high-pressure container according to another embodiment.

Next, a mixing step of the various charged gases within the high-pressure container 1 will be described. It is supposed that the high-pressure container 1 is divided into a plurality of regions, and a mixing ratio of gases at any portion within the region and also in every regions should be uniform. FIG. 6 shows a high-pressure container 31 divided into two regions. Any element which is the same as that shown in FIG. 1 is shown with the same reference numeral. The high-pressure container 31 is divided into a first region 32 and a second region 33, and both the regions are in communication with each other through a vent opening 34. It is supposed here that a gas to be charged first is a hydrogen and a gas to be charged later is oxygen. Although any separating means described above may be used, FIG. 6 shows an example in which the partitioning member 15 is used as the separating means. Because the oxygen is charged such as to extrude the hydrogen, at the time point just after both the gases are charged, the composition of the hydrogen is higher in the first region 32 and the composition of the oxygen is higher in the second region 33. But because both the regions are in communication, the mixing ratio of gases in both the regions will be equal after a predetermined time is elapsed.

Figure 7:
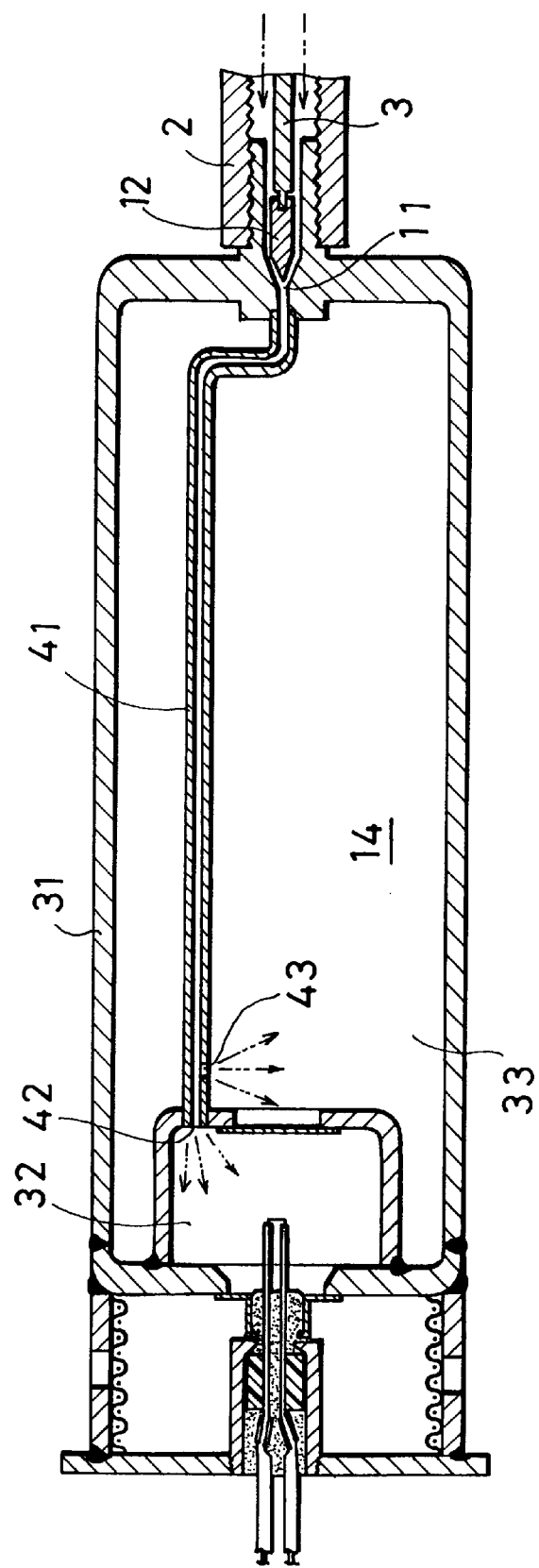
FIG. 7 is a sectional side view of a high-pressure container according to another embodiment.

As described above, according to the present invention, it is possible to charge gases into the high-pressure container which is divided into a plurality of regions. However, with such a high-pressure container, a time period required to uniform the mixing ratio of the gases becomes longer, as compared with a high-pressure container having a single region. FIG. 7 shows a high-pressure container 31 which is designed to shorten the time period required to uniform the mixing ratio of the gases. A reference numeral 41 denotes a tube having one end mounted to the charging port 11. The tube 41 is provided at its other end with ejection ports 42 and 43 which are openings. With this arrangement, because gases can be charged into the first and second regions 32 and 33 simultaneously, the mixing ratio of gases in both the regions can be made substantially equal to each other. Further, in the vicinity of the charging portion 11, because the gas charged later extrudes the gas charged first, the gas composition can be set out of flammable range. The ejection ports 42 and 43 also function as vent openings. A diameter, a mounting position and an orientation of an axis of each of the ejection ports 42 and 43 may arbitrarily be selected.

Further, it is also effective to provide the separating means with auxiliary means for promoting the mixing of the gases. The high-pressure container shown in FIG. 2 uses a spiral tube 151 and therefore, the gas ejected from the ejection port 16 flows spirally (as shown by the arrow), which promotes the mixing of the gases within the high-pressure container 1. FIG. 4 shows the ejection port 16 provided with the dispersion means 21 made of porous material having an air permeability such as a sintered material. FIG. 5C shows the means for deflecting a flow of gas ejected from the separating means 153 into the high-pressure container 1.

In the above described embodiment and all of the modifications, the charging port is disposed on a central axis of the high-pressure container. However, the charging port may be disposed at a position deviated from the central axis or a position on an axis intersecting the longitudinal axis of the high-pressure container. Further, a number of the ejection ports of the separating means, orientation of the axis of the ejection port and a shape thereof may arbitrarily be selected.

Each of the above described charging method, charging structure and material to be charged may also be applied to a high-pressure container provided in a gas generating apparatus for an air bag apparatus described in the column of "PRIOR ART", which also provides the same effect.

Although it will be understood that the invention is not limited to the above described embodiments, and various modification and design may be made without departing from the spirit and scope of the invention defined in claims.

What is claimed is:

1. A charging structure of a combustible gas and an oxidizer gas, comprising:

a container for containing the combustible and oxidizer gases therein, said container having a charging port for charging the combustible and oxidizer gases;

a sealing member for sealing said charging port; and separating means for substantially separating the combustible gas and the oxidizer gas at least in the vicinity of said charging port during a predetermined time period beginning, from a time point after charging of the combustible and oxidizer gases into said container through said charging port, to a time point when said charging port is sealed by said sealing member, wherein said separating means defines a flow path such that the combustible gas and the oxidizer gas are not substantially mixed therein during the predetermined time period in such a case where one of the combustible and oxidizer gases is first charged and thereafter the other of the combustible and oxidizer gases is charged.

2. The charging structure of a combustible gas and an oxidizer gas according to claim 1, wherein said separating means comprises a partitioning member which partitions said container into a smaller chamber surrounding said charging port and a larger chamber surrounding said smaller chamber, and which includes a fine hole for bringing said smaller and larger chambers into communication with each other.

3. The charging structure of a combustible gas and an oxidizer gas according to claim 1, wherein said separating means comprises a spiral tube-like member for defining said flow path which is spirally continuous with said charging port in said container.

4. The charging structure of a combustible gas and an oxidizer gas according to claim 1, wherein said separating means comprises a cylindrical member for defining said flow path which is spirally continuous with said charging port in said container.

5. The charging structure of a combustible gas and an oxidizer gas according to claim 1, wherein said separating means comprises a deflection plate disposed such as to oppose to said charging port in said container for deflecting a gas flow.

6. The charging structure of a combustible gas and an oxidizer gas according to claim 5, wherein said deflection plate is provided with a partitioning plate for rotating and flowing out the gas.

7. The charging structure of a combustible gas and an oxidizer gas according to any one of claims 1 to 6, at least a portion of said separating means is provided with throttling means for throttling a gas flow.

8. The charging structure of a combustible gas and an oxidizer gas according to any one of claims 1 to 6, wherein said sealing member for the charging port is any one of a pin, a cap or a plate.

9. The charging structure of a combustible gas and an oxidizer gas according to claim 8, wherein said sealing member includes a portion which is softer than said container.

10. The charging structure of a combustible gas and an oxidizer gas according to any one of claims 1 to 6, wherein said separating means includes an ejection port provided with dispersing means for dispersing a gas flow.

11. The charging structure of a combustible gas and an oxidizer gas according to claim 10, wherein said charging structure is used for a gas generating apparatus for an air bag apparatus.

12. The charging structure of a combustible gas and an oxidizer gas according to claim 1, wherein said container is divided into two regions or more, and said separating means charges the combustible and oxidizer gases into each of the regions substantially uniformly.

13. The charging structure of a combustible gas and an oxidizer gas according to any one of claims 1 to 6, wherein the combustible and oxidizer gases are charged in said container by means of said charging structure.

* * * * *